United States Patent
Douglas et al.

(10) Patent No.: US 7,197,013 B2
(45) Date of Patent: Mar. 27, 2007

(54) QUALITY EVALUATION FOR WIRELESS COMMUNICATION NETWORKS

(75) Inventors: Bretton Douglas, Sunnyvale, CA (US); Timothy Olson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/791,466

(22) Filed: Mar. 1, 2004

(65) Prior Publication Data

US 2005/0190732 A1   Sep. 1, 2005

(51) Int. Cl.
*H04L 12/26* (2006.01)
(52) U.S. Cl. ............... 370/252; 370/329; 370/338
(58) Field of Classification Search ........ 370/229–240, 370/241–253, 310, 328–329, 338, 445; 455/446
See application file for complete search history.

(56) References Cited

U.S. PATENT DOCUMENTS

| | | | |
|---|---|---|---|
| 5,537,530 A * | 7/1996 | Edgar et al. ............... 715/723 |
| 6,317,599 B1 | 11/2001 | Rappaport et al. | |
| 6,499,006 B1 | 12/2002 | Rappaport et al. | |
| 6,625,454 B1 | 9/2003 | Rappaport et al. | |
| 2002/0159395 A1* | 10/2002 | Nelson et al. ............... 370/252 |
| 2003/0134641 A1* | 7/2003 | Gustafsson ................. 455/446 |
| 2004/0106410 A1* | 6/2004 | Choi et al. .................. 455/446 |
| 2004/0121749 A1 | 6/2004 | Cui et al. | |
| 2004/0236547 A1* | 11/2004 | Rappaport et al. ............ 703/2 |
| 2004/0258000 A1* | 12/2004 | Kamali et al. .............. 370/252 |
| 2004/0259555 A1* | 12/2004 | Rappaport et al. ......... 455/446 |
| 2005/0054296 A1* | 3/2005 | Chuang et al. ............ 455/63.1 |

OTHER PUBLICATIONS

Scalable Networks Press Release, May 12, 2004, http://www.scalable-networks.com/new/press/pressreleases13.php.
Scalable Networks Product Description for Product announced on May 12, 2004 http://www.scalable-networks.com/products/qualnet_wifi.php.
LANPlanner® SE Product Brochure, Wireless Valley, 2404 Rutland Drive, Suite 700, Austin, Texas 78758, Jan. 2004.

* cited by examiner

*Primary Examiner*—Huy D. Vu
*Assistant Examiner*—Jason Mattis
(74) *Attorney, Agent, or Firm*—Cindy Kaplan

(57) ABSTRACT

Systems and methods for evaluating wireless network quality. A metric provided by embodiments of the present invention relies on information that is relatively easy to collect, can be very efficiently computed, and yet provides a realistic estimate of likely wireless network performance. In one implementation, the input includes path loss data and access point transmitter power level and frequency settings. A capacity indicator is computed for each client and each access point. A data rate indicator is computed for each client location. The traffic load is computed for each access point. Based on these computed indicators, a bidirectional client throughput can be computed for each client and a combined metric can be determined for the network as a whole.

20 Claims, 11 Drawing Sheets

QUALITY EVALUATION FOR WIRELESS COMMUNICATION NETWORKS

BACKGROUND OF THE INVENTION

The present invention relates to wireless communications and more particularly to systems and methods for evaluating network quality.

Wireless communication networks, for example wireless communication networks providing network access in a building or on a campus, are highly complex systems that serve a multitude of client devices using multiple access points. The network planner seeks to provide ubiquitous coverage, high throughput, and relatively even loading on the access points. There are many network parameters that may be adjusted in seeking to achieve this ideal. These parameters include placement of the access points, frequencies of operations of the access points, transmitter power levels, modulation rates, etc. Algorithms have been developed that seek to optimize these parameters to achieve the best network service possible.

To determine whether a particular combination of parameter values is optimal in any sense or better than some other combination of parameters, it is necessary to devise a metric for assessing network quality. In the course of performing either a manual or automatically operated optimization algorithm, such a metric will have to be evaluated numerous times. A requirement thus emerges for a network quality metric that requires only information that is relatively easy to assemble and input and can be evaluated relatively quickly for a given set of network parameters values, but yet provides a realistic estimate of likely performance of the network that corresponds to the user experience.

Previous network planning tools and their associated metrics have been developed in the context of cellular telephone systems. By contrast, the wireless local area network (LAN) applications have different characteristics that change the nature of the network evaluation problem. As compared to LANs, cellular networks are outdoors, operate over longer ranges, typically operate at lower carrier to interference ratios, and use very different methods of media access control. The quality metrics developed in the cellular telephone context are not applicable to wireless LANs.

What is needed are new systems and methods for evaluating the quality of wireless networks including wireless LANs.

SUMMARY OF THE INVENTION

Embodiments of the present invention provide systems and methods for evaluating wireless network quality. A metric provided by embodiments of the present invention relies on information that is relatively easy to collect, can be very efficiently computed, and yet provides a realistic estimate of likely wireless network performance. In one implementation, the input includes path loss data and access point transmitter power level and frequency settings. A capacity indicator is computed for each client and each access point. A data rate indicator is computed for each client location. The traffic load is computed for each access point. Based on these computed indicators, a bidirectional client throughput can be computed for each client and a combined metric can be determined for the network as a whole.

One embodiment of the present invention provides a method of assessing communication quality in a wireless network comprising a plurality of access points. The method includes: receiving as input path loss information indicating path losses between a selected client of said wireless network and said access points, based on said path loss information, determining a capacity indicator that estimates communication impairment for said client due to contention or collision, based on said path loss information, determining a data rate indicator that estimates an achievable data rate for communication by said selected client, determining a cell loading indicator that estimates communication impairment due to overloading of a cell occupied by said selected client, and, based on said capacity indicator, said data rate indicator, and said cell loading indicator, determining a client throughput.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative wireless network that employs one of the IEEE 802.11 standards such as, e.g., 802.11a, 802.11b, 802.11g, or currently envisioned standards such as 802.11n. All of the documents defining these standards are incorporated herein by reference in their entirety for all purposes. In the example discussed herein, a region to be covered by a wireless network is divided into cells with each cell having an access point. Clients are associated with a particular access point and can communicate to and from the network via that access point.

When a radio plan is developed for wireless LAN, the operator has control of at least two different parameters for each access point: the channel assignment and transmit power. The operator may also have control of other parameters such as the threshold for packet detection and allowed data rates.

The goal of a radio planning algorithm is to find the access point settings that provide the best possible solution. The ideal solution is one that provides high overall network throughput, complete coverage of a particular space, and relatively even loading on the access points. A critical step in this process is evaluation of the quality of each possible solution. The quality evaluation should preferably take into account the following factors:

1. The channel of each access point and associated clients.
2. The transmit power of each access point and associated clients.
3. The sensitivity and required carrier to interference ratio for each possible physical layer data rate.
4. Contention and collision between access points and clients that occupy the same channel and that occupy adjacent channels.
5. Interference from access points that are not controlled by the operator.
6. The traffic load imposed on each access point by its clients.
7. The physical space to be covered.
8. The propagation characteristics of that physical space.
9. The data modes enabled at each access point.

Embodiments of the present invention provide a metric that takes all these factors into account and quickly converts them into a measure of overall "goodness." A radio planning algorithm can then efficiently search through different possible combinations of access point settings and find a globally optimal, or at least a very good, solution.

Figure 1:
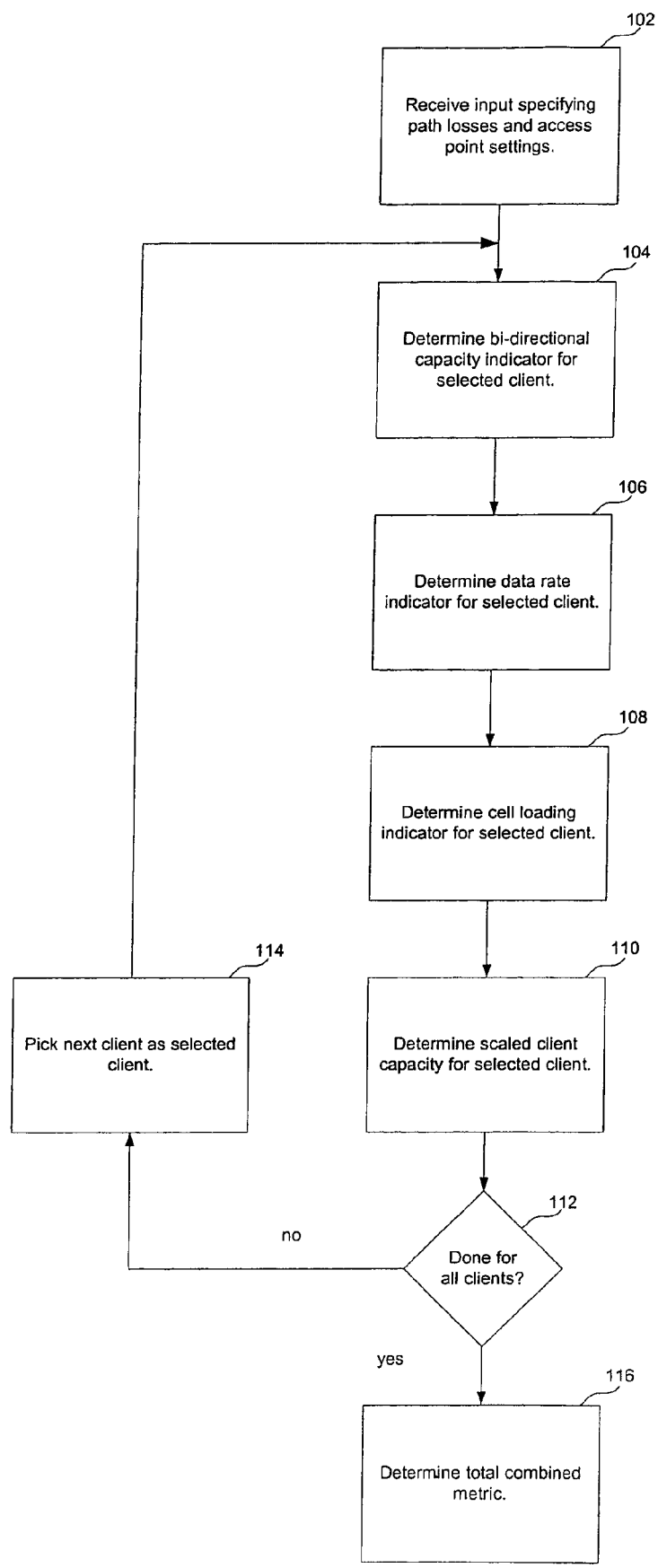
FIG. 1 is a flowchart describing steps of evaluating communication quality for a selected client according to one embodiment of the present invention.

FIG. 1 is a flow chart describing steps of evaluating communication quality for the communication network according to one embodiment of the present invention. At step 102, the metric evaluation procedure receives input specifying path losses and access point settings. The path loss values indicate the path attenuation from a series of walkabout points to each access point as well as the attenuations between access points. Some of the walkabout points will correspond to actual client locations or be used as proxies for client locations in the calculations that follow. The path loss values are preferably based on actual measurements rather than on propagation modeling. The access point settings include the channels of operation. For example, in one implementation, the channel set (1, 6, 11) is specified for each access point. It is also possible for the input to specify a particular channel set among several selections including, e.g. (1, 6, 11), (1, 4, 8, 11), or (1, 4, 6, 8, 11). The access point settings may also include a list of allowed data rates since access points may be configured to operate only in a subset of possible data rate modes.

A series of steps following step 102 are performed iteratively for each client. The term "client" as used herein is taken to also include walkabout locations taken as proxies for clients. Step 104 determines a bi-directional capacity indicator for a selected client. Capacity as defined in this context as how readily an access point can transmit data downstream to clients, or conversely how readily a client can transmit information upstream to the access point. Effectively, the bi-directional capacity indicator measures impairment due to likely contention or collision situations. Details of computing the bi-directional capacity for a selected client are described in detail below. The computation of the bi-directional capacity indicator incorporates an upstream capacity computation for the client and a downstream capacity computation for the access point the client is associated with.

A step 106 determines a data rate indicator for the selected client. The received signal strength is mapped into a rate of data transfer between the client and the access point. Each possible data rate has a signal level above which data can be transferred reliably. The received signal strength is mapped to a physical layer data rate using a lookup table. That physical layer data rate is then converted into a MAC layer data rate using a lookup table such as the one that follows.

| Modulation Mode | Data Rate | Typical Rx Sensitivity (typical) | MAC Throughput |
|---|---|---|---|
| 802.11b | 1 Mb/s | −92 dBm | .75 Mb/s |
|  | 2 Mb/s | −86 dBm | 1.2 Mb/s |
|  | 5.5 Mb/s | −84 dBm | 2.3 Mb/s |
|  | 11 Mb/s | −77 dBm | 3.2 Mb/s |
| 802.11a | 6 Mb/s | −88 dBm | 3.4 Mb/s |
|  | 9 Mb/s | −79 dBm | 4.6 Mb/s |
|  | 12 Mb/s | −81 dBm | 5.4 Mb/s |
|  | 18 Mb/s | −78 dBm | 6.7 Mb/s |
|  | 24 Mb/s | −76 dBm | 7.8 Mb/s |
|  | 36 Mb/s | −69 dBm | 9 Mb/s |
|  | 48 Mb/s | −64 dBm | 9.7 Mb/s |
|  | 54 Mb/s | −60 dBm | 10.1 Mb/s |

Figure 7A:
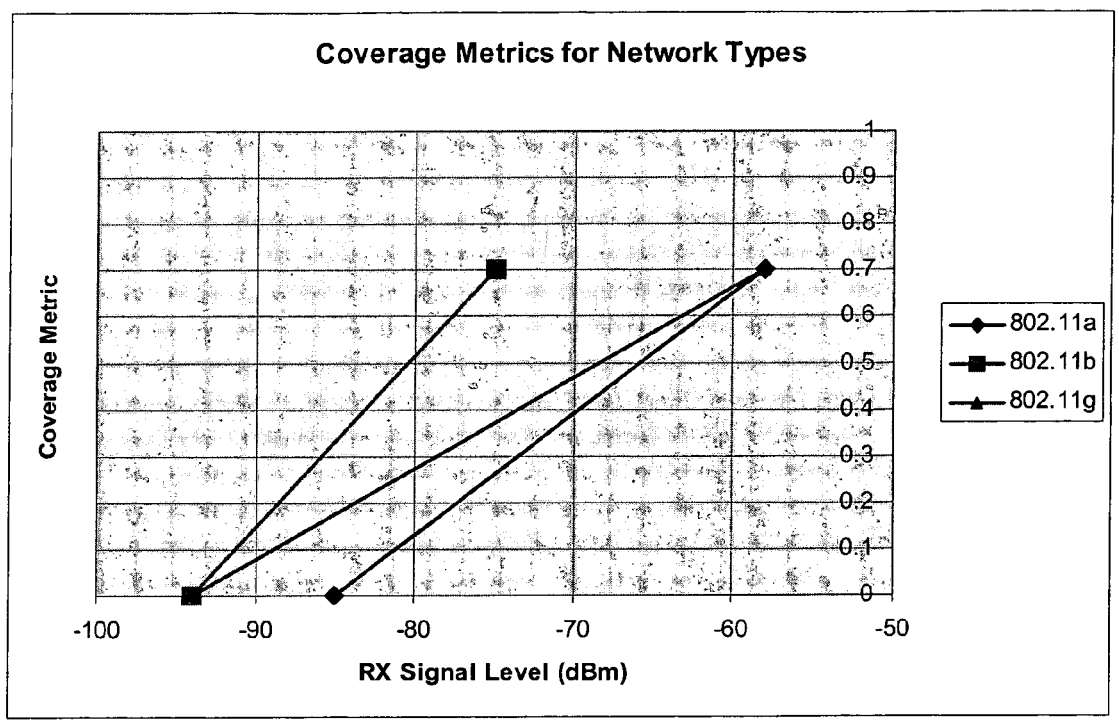
FIG. 7A depicts coverage metrics for different variants of the 802.11 standard according to one embodiment of the present invention.
Figure 7B:
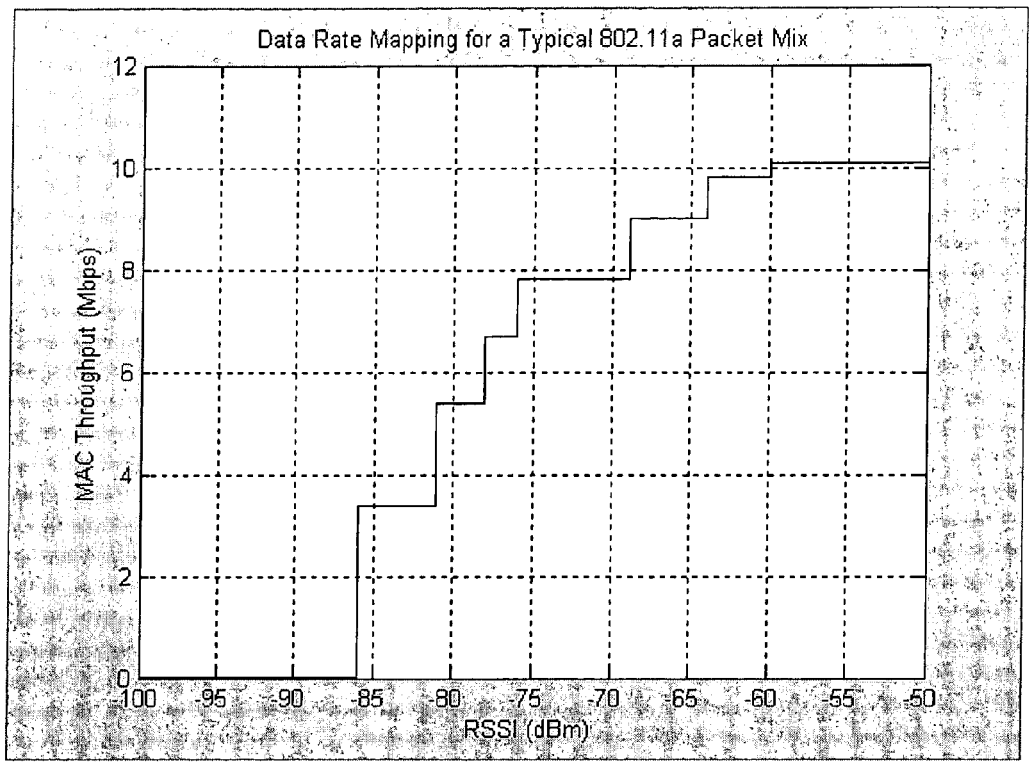
FIGS. 7B–7D depict data rate metrics for different variants of the 802.11 standard according to one embodiment of the present invention.
Figure 7C:
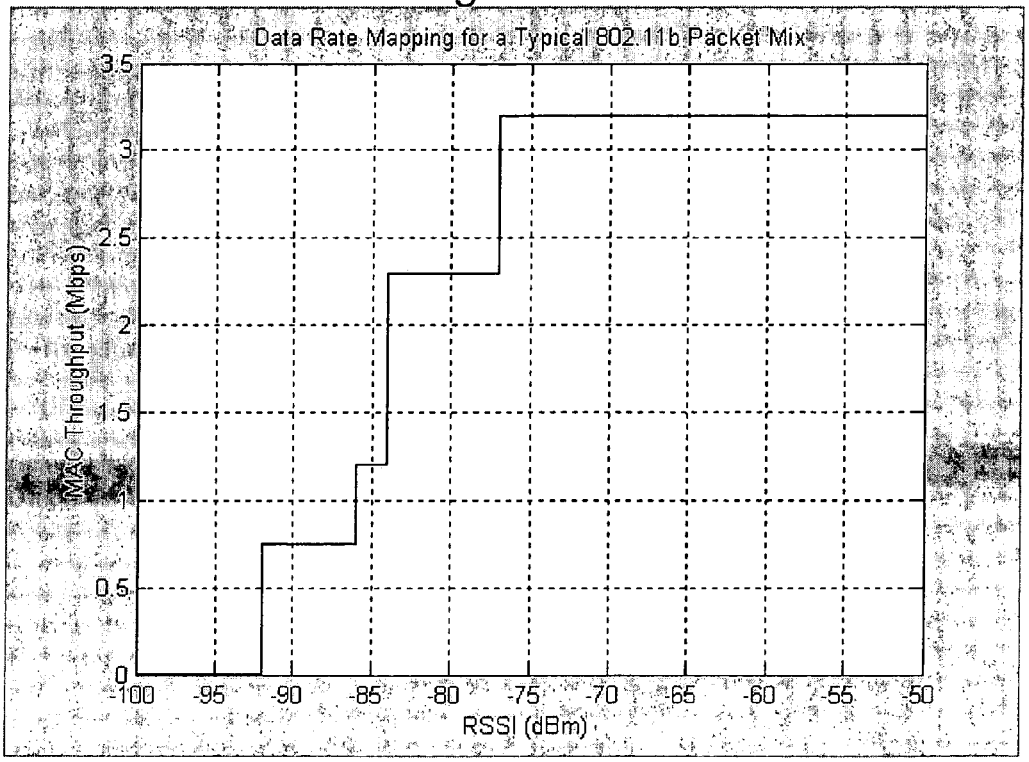
Figure 7D:
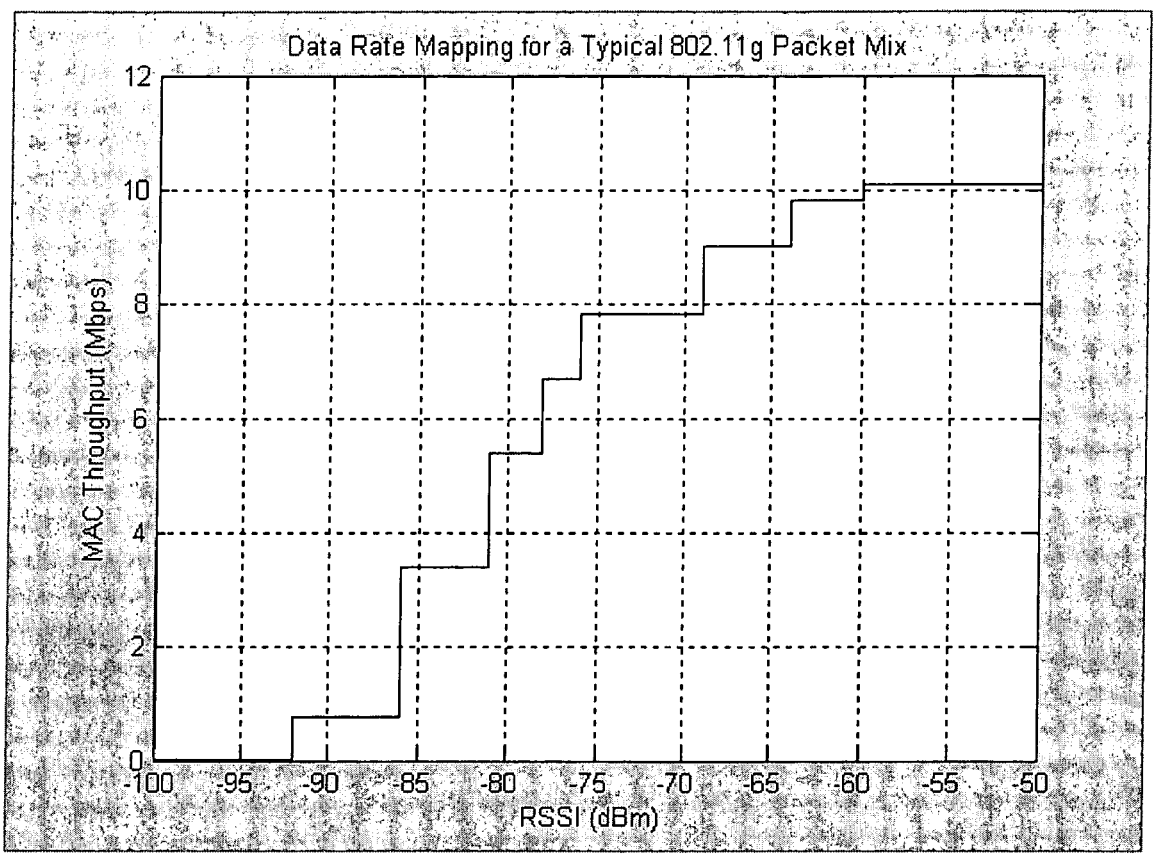

FIGS. 7B–7D graphically illustrate the relationships between receiver sensitivities and data rates for 802.11a, 802.11b, and 802.11 g, respectively. The mapping of the physical layer data rate into the MAC layer data rate depends on the average packet size and the MAC protocol being used. Therefore the network performance can be optimized for voice (short 100 to 200 byte packets) or for large TCP-IP transfers (1536 byte packets). The above table and FIGS. 7B–7D are for a typical packet mix with a mean packet size of 364 bytes.

A step 108 determines a cell loading indicator for the selected client. Cell loading actually needs to be determined only once for each access point so it will be understood that the cell loading indicator for a client is in fact a cell loading indicator of the access point to which it is associated. The cell loading indicator accounts for a throughput drop that results when too many clients are associated to a single access point. The user of the evaluation procedure defines the maximum number of clients that can be associated to a single access point without performance degradation. Up to that maximum number, no degradation is experienced while beyond that number, the cell loading metric falls off proportionally to 1/(number of associated clients). Further details of cell loading are explained below.

The capacity, data rate, and cell loading indicators are used to provide a measure of the data throughput of each client. At step 110 determines a scaled client capacity for a selected client. The metrics are combined as follows:

Client Throughput=Client Bidirectional Capacity Indicator*Client Data Rate*Cell Loading Indicator.

The client throughput provides an estimate of the mean rate of data transfer between the client and its access point. The reciprocal provides a measure of the amount of time it will take to transfer large data records to and from a particular client.

A step 112 tests whether the calculations of steps 104–110 have been done for all clients in the network. If there are further clients for which to compute the appropriate indicators, step 114 picks the next client as the selected client and then execution returns to step 104. If scaled client capacity has been determined for all of the clients, then the metric computation reaches step 116 where a total combined metric for the network is determined. The combined quality metric is preferably defined as:

$$\frac{1}{\sum_{all\ clients} 1/\text{client throughput}}$$

The above combined metric is not exactly the same as the total network capacity. The combined metric gives more weight to client locations with poor performance than those with good performance. A network where 90% of the clients can receive 11 Mbps and 10% of the clients can receive nothing is penalized as compared to a network where 80% of the clients receive 11 Mbps, 10% receive 5.5 Mbps, and 10% receive 1 Mbps. Alternatively, a total network capacity may be determined as a mean of all of the scaled client throughputs times the total number of access points in the network:

Capacity Details

Capacity is defined for each access point, for each client location, and for the entire network. The evaluation procedure relies on assumptions as to the fraction of time that the fully loaded wireless medium transmits successfully in the uplink and downlink. Representative values are $P_U$=0.2 (probability that a transmission on that link will be upstream) and $P_D$=0.8 (probability that a transmission on that link will be downstream). From the viewpoint of capacity, the ideal is a single access point and a few clients operating with no potential co-channel or adjacent-channel interference. Such a situation will yield a capacity measure of 1. Interference from other cells will lower the expected capacity for that cell to some value less than 1. The metric penalizes capacity when stations experience contention or collision. Capacity computations depend on received signal strengths. The received signal strengths are determined based on the transmit power and path losses that were input to the algorithm.

There are theoretically 9 different types of contention and collision that could occur within a cell. There are:

1. External access points contending with the access point attempting to transmit downstream.

2. External access point colliding with the access point attempting to transmit downstream.

3. External access point contending with a client attempting to transmit upstream.

4. External access point colliding with a client attempting to transmit upstream.

5. External client contending with an access point attempting to transmit downstream.

6. External client colliding with an access point attempting to transmit downstream.

7. External client contending with a client attempting to transmit upstream.

8. External client colliding with a client attempting to transmit upstream.

9. Client collides with another client in the same cell.

To alleviate the need for cumbersome client-to-client path loss measurements, the presently described evaluation procedure only takes into account the first 5 types of contention and collision. The use of the scaling factors $P_U$ and $P_D$ within the capacity calculations allows results based on only the first 5 types of contention and collision to serve as a realistic estimate of the desired capacity indicator.

First let us consider the downstream capacity of an access point. The downstream capacity of an access point is calculated as its ability to transmit downstream data in the presence of interference from other access points and clients from other cells. The access point capacity is expressed as a quotient where the numerator is always 1. In an ideal case, the denominator is also 1, but co-channel interference from other cells will increase the value of the denominator. As will be shown, the denominator will be equal to 1 plus the sum of various degradation indicators.

Figure 2:
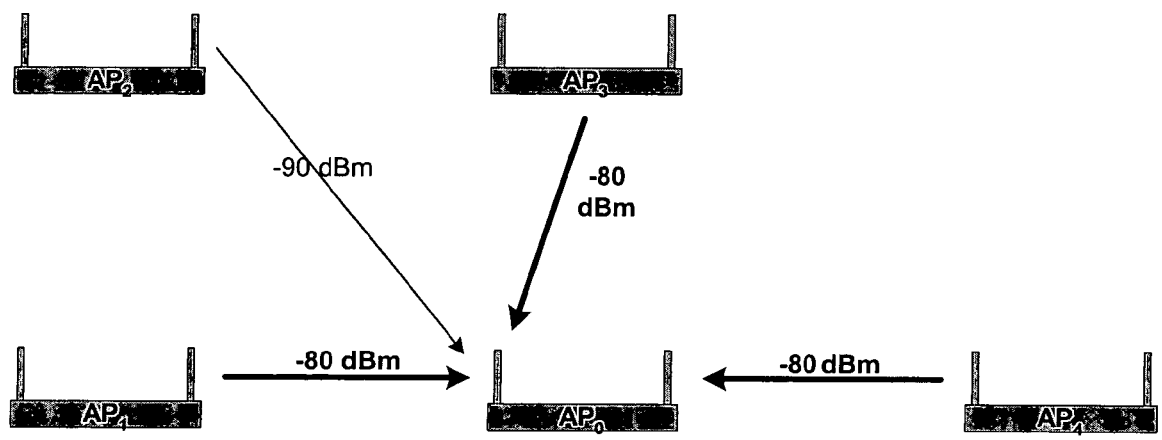
FIG. 2 depicts access point contention with other access points as evaluated by embodiments of the present invention.

The capacity calculation including the determination of various degradation indicators will be discussed with reference to a specific example. FIG. 2 shows access point contention with other access points. All 5 access points operate on the same channel and the receiver sensitivity for the minimum data rate mode is −85 dBm. The arrows show the received signal strengths at $AP_0$ for co-channel transmission by the other access points. The received signal levels are derived from the path losses and transmission powers that were input to the evaluation procedure. Signals transmitted by $AP_1$, $AP_3$, and $AP_4$ are all at −80 dBm, 5 dB above the receiver sensitivity of $AP_0$. Since $AP_0$ will hear these transmission before it attempts to transmit, $AP_0$ will not transmit when any of these three access points are transmitting. By contrast, signals transmitted from $AP_2$ arrive at $AP_0$ at −90 dBm, below the receiver sensitivity threshold. Therefore, contention with $AP_2$ will not degrade the downstream throughput. The degradation indicator for this type of contention is computed to be:

$P_d$*No_AP_Contend where $P_d$ is the probability of the contending access point wants to transmit, nominally set to 0.8; and No_AP_Contend=the number of transmitting access points that can be received by the access point of interest, 3 in our example.

In this example, the degradation caused by the other access points is 0.8*3=2.4.

Figure 3:
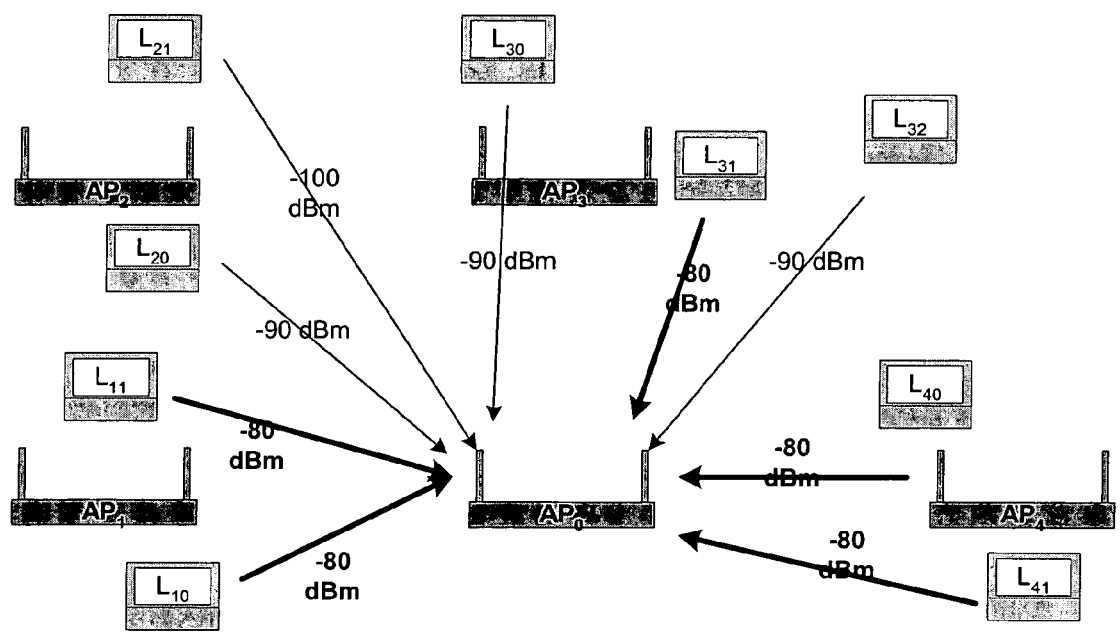
FIG. 3 depicts access point contention with clients as evaluated by embodiments of the present invention.

FIG. 3 shows downstream traffic degradation due to contention with clients associated with other access points. In this example, $L_{10}$ and $L_{11}$ are associated with $AP_1$, $L_{20}$ and $L_{21}$ are associated with $AP_2$, $L_{30}$, $L_{31}$, and $L_{32}$ are associated with $AP_3$, and $L_{40}$ and $L_{41}$ are associated with $AP_4$. The sensitivity of $AP_0$ is −85 dBm so transmissions from $L_{10}$, $L_{11}$, $L_{31}$, $L_{40}$, $L_{41}$ will cause $AP_0$ to wait to transmit its downstream data, thus degrading the quality of its downstream link. The quantitative measure of degradation caused by each potentially colliding client is calculated as:

$P_U$/Number of clients in the same cell.

So for $P_U$=0.2, the contending clients contribute as follows:

$L_{10}$=0.2/2=0.1
$L_{11}$=0.2/2=0.1
$L_{20}$=0, No Contention
$L_{21}$=0, No Contention
$L_{30}$=0, No Contention
$L_{31}$=0.2/3=0.067
$L_{32}$=0, No Contention
$L_{40}$=0.2/2=0.1
$L_{41}$=0.2/2=0.1

The sum of all the degradations caused by clients contending with $AP_0$ is 0.467.

Figure 4:
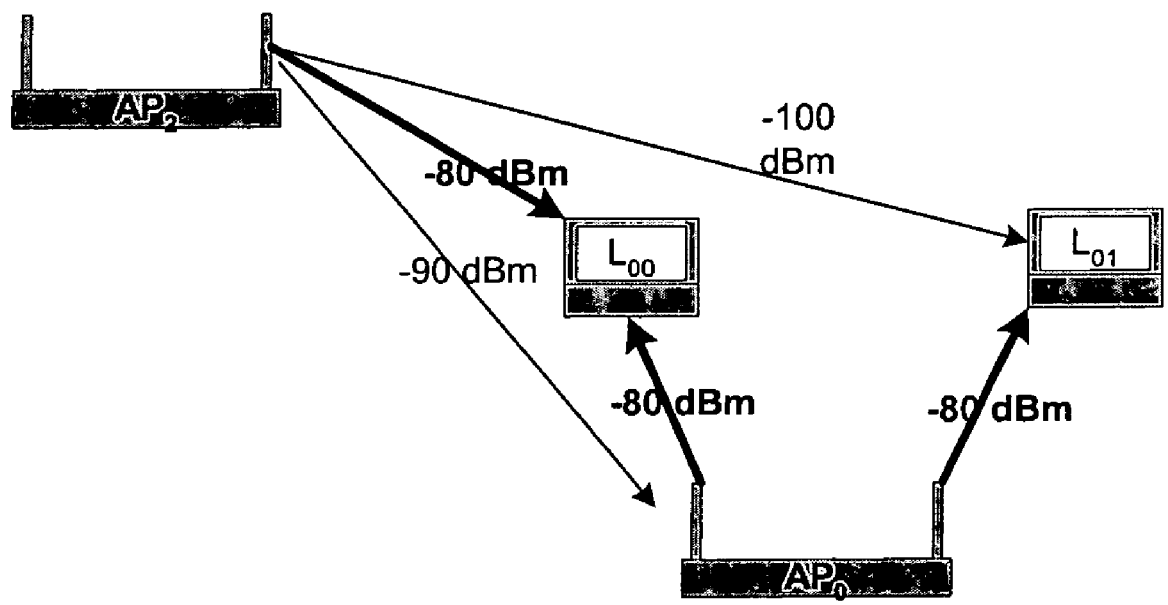
FIG. 4 depicts access point collision with other access points as evaluated by embodiments of the present invention.

FIG. 4 depicts access points colliding with other access points. In FIG. 2, it was shown that $AP_0$ would contend with $AP_1$, $AP_3$, and $AP_4$ for the channel, but it would not contend with $AP_2$ because the signal from $AP_2$ was too weak to be detected by $AP_0$. Therefore it is possible that $AP_2$ could be transmitting simultaneously with $AP_0$ since $AP_0$ will not know to delay its transmission. If the signal from $AP_2$ is strong enough to corrupt reception at the clients associated with $AP_0$, $AP_2$'s transmissions will potentially collide with downstream traffic from $AP_0$. The potential for collision is based on the needed carrier to interference ratio. This is determined by first calculating the received signal strengths at the access point and the client, then determining the physical layer data rate and required carrier to interference ratio by reference to a look-up table.

Referring now to FIG. 4, if the clients $L_{00}$ and $L_{01}$ are operating in a data mode that requires 15 dB carrier to interference ratio, $L_{00}$ will experience collisions from $AP_2$ while $L_{01}$ will not. The first client, $L_{00}$ receives a signal of −80 dBm from $AP_0$ and it receives an interfering signal of −80 dBm from $AP_2$. The carrier to interference ratio is therefore 0 dB, and $L_{00}$ will therefore experience a collision. The client $L_{01}$ receives a signal of −80 dBm from $AP_0$ and an interfering signal of −100 dBm from $AP_2$, resulting in a carrier to interference ratio of 20 dB, sufficient to avoid a collision.

The degradation caused by these access point collisions from another access point is calculated as follows:

$$2 * \sum_{\text{other access points}} \frac{\text{number of clients experiencing collisions from other access points}}{\text{number of clients in cell}}$$

The summation is taken over all access points other than the access point whose capacity is being measured. In this example, there is only one access point causing a collision, so the total degradation is 2*(1/2)=1.

The total access point capacity is then computed as follows:

Numerator=1

Denominator=(1+Degradation due to access point to access point contention+Degradation due to access point to client contention+Degradation due to access point to access point collisions)

In this example, the capacity would be:

Numerator=1

Denominator=1+2.4+0.467+1=4.867

Access point capacity=1/4.867=0.205

Contention and collision from other cells will also cause a reduction in the upstream capacity of each client. Upstream client capacity can be degraded by contention from other access points as well as collision from other access points. Client contention from other access points occurs when signals transmitted from other cells arrive at the client and lead the client to believe its channel is busy, causing the client to delay transmission. Client collision from other access points is caused when signals transmitted from access points in other cells arrive at sufficiently weak levels such that the client transmits simultaneously, however, the carrier to interference ratio at the client's associated access point is too low for successful data recovery there. Similar to the access point computation, the client upstream capacity computation employs a ratio where the numerator is one and the denominator is one plus a sum of degradation indicators.

Figure 5:
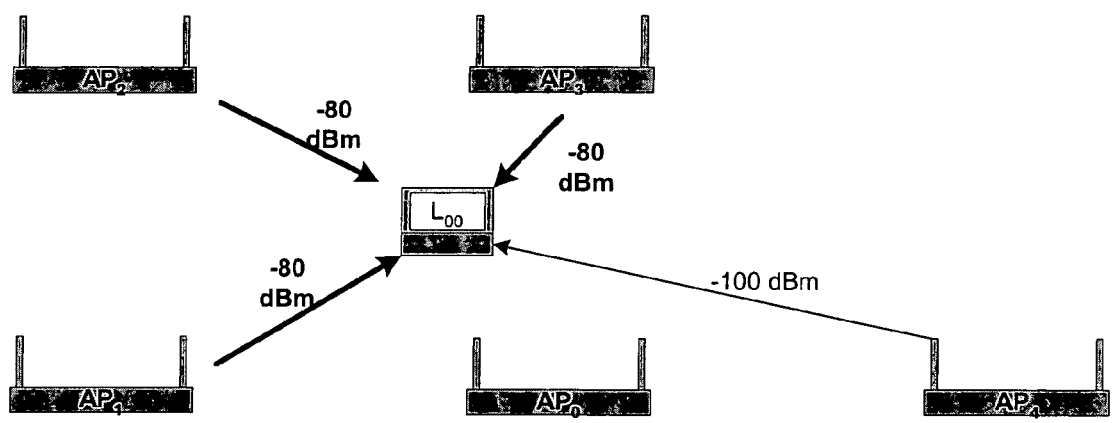
FIG. 5 depicts client contention with access points other than an access point associated with the client as evaluated by embodiments of the present invention.

FIG. 5 depicts client contention with other access points. The client at location $L_{00}$ wants to transmit data to $AP_0$ however, it can detect signals transmitted from $AP_1$, $AP_2$, and $AP_3$. It cannot hear signals transmitted from $AP_4$. Whenever $AP_1$, $AP_2$, and $AP_3$ are transmitting, $L_{00}$ delays transmission. The degradation caused by contention from other access points is evaluated to be equal to the number of access points from other cells that can be detected at the client. In this example, for $L_{00}$, the degradation is 3.

Figure 6:
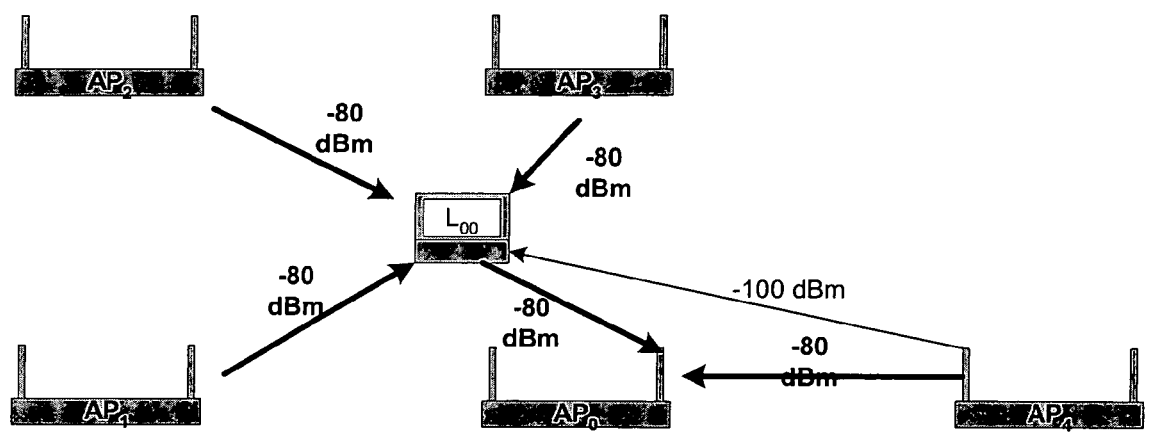
FIG. 6 depicts client collisions with access points other than an access point associated with the client as evaluated by embodiments of the present invention.

FIG. 6 depicts client collisions with access points other than the one it is associated to. Client $L_{00}$ hears signals transmitted from $AP_1$, $AP_2$, and $AP_3$ so it will delay transmission. However, $L_{00}$ will not hear signals transmitted from $AP_4$ so there is a potential for a collision. When client $L_{00}$ transmits to $AP_0$, the signal arrives at −80 dBm. If $AP_4$ transmit simultaneously, the carrier to interference ratio for the received client signal is 0 dB, insufficient for successful data recovery. The indicator for this type of degradation is computed to be 2 multiplied by the number of access points capable of causing a collision. An access point is capable of causing a collision if the signal from that access point received at the client's associated access point causes the received client signal carrier to interference ratio to fall below the threshold necessary for accurate reception. In this example, this expression is equal to 2 since there is one such access point capable of causing a collision.

The total upstream capacity for a client is calculated as follows:

Numerator=1

Denominator=1+Degradation caused by contention with out-of-cell access points+Degradation caused by collisions with out-of-cell access points.

In this example:

Numerator=1

Denominator=1+3+2=6

Total upstream client capacity=1/6 or 0.167.

The total bidirectional client capacity is then:

Associated Access Point Capacity*$P_d$+Client Upstream capacity*$P_u$

Where $P_d$ is nominally 0.8 and $P_u$ is nominally 0.2. In this example, the result is 0.1974. This is the value that is used in computing the scaled client capacity at step 110.

Cell capacity=access point capacity*$P_d$+mean client capacity*$P_u$. The mean client capacity is the average upstream client capacity for the clients associated with the access point of a cell.

Cell Loading

Cell loading is a measure of degradation caused by an excessive number of clients in a cell potentially contending for the same channel. The exact number of clients that can successfully share a channel in a cell depends on separately generated usage models. A parameter generated by such a usage model is max_clients which is the maximum number of clients in a cell before performance suffers as determined by the usage model. An additional parameter to be entered by the operator is mean_clients which is equal to the average number of clients in each cell.

First, the number of clients in each cell is estimated by: EST_CLIENTS=(number of walkabout points in cell/total number of walkabout points)*mean_clients. The capacity scaling factor due to overcrowding on an access point is then calculated as:

Cell_Loading_factor=max_clients/max(max_clients, est_clients)

Figure 8:
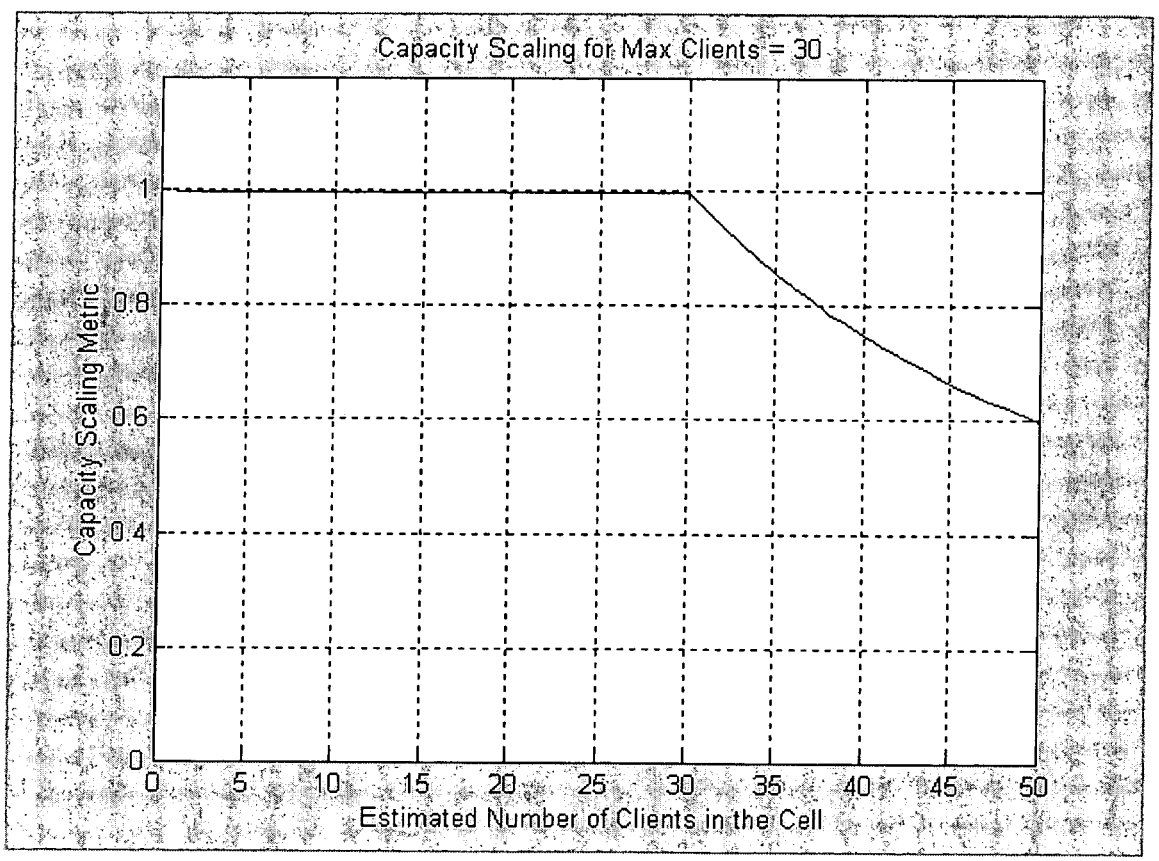
FIG. 8 depicts a cell loading metric according to one embodiment of the present invention.

FIG. 8 depicts how the cell loading factor varies as the number of clients increases. When max_client is set to 30, there is no penalty until the number of clients exceeds 30. After that, the cell loading factor decreases proportionately to (1/number of clients).

It will be seen then that the various interference degradations including contention and collision are quickly converted into estimates of how readily information can be transferred to and from a particular access point and client. The overall metric, by being a product of capacity, data rate, and cell loading, takes into account interference from other cells, the strength of received signals, and contention within the cell.

The adjustment of wireless network operation parameters involves a tradeoff between two factors. As power increases, the ability of each access point to transfer data at the highest possible data rate improves. However, interference between cells operating on the same channel also increases. The metric of network quality provided by embodiments of the present invention facilitates finding the optimal point in that tradeoff. Since the metric is calculated readily using measured data, operation of the parameter search algorithm is facilitated. Also, by use of this metric, optical network performance will be obtained since what is being minimized is the meantime for data transfer to and from the clients.

Significant advantages are provided over planning tools that rely on propagation modeling. No propagation model is ever 100% accurate and a typical RMS error for path loss models is 5 to 10 dB. A relatively small path loss error can make the difference between whether two access points contend for a channel or not. By employing real measured path loss data, uncertainty in evaluating the likelihood of contention or collision is minimized.

The example capacity calculation described above dealt with co-channel interference. Embodiments of the present invention may also deal with adjacent channel interference that causes contention and collisions. A suitable additional attenuation factor may be added to path losses for adjacent channel transmitters to determine whether contention or collision is possible from a given transmitter.

Coverage

It may also be useful to compute an additional coverage metric. Coverage is defined in this context as a unitless measure of available physical layer data rate between the client and the access point to which it is associated under the relevant operative protocols. When the signal strength from the access point to the selected client is lower then the sensitivity of the minimum configured data rate mode, no information can be transmitted from the access point to the client so the coverage metric is zero. When a signal strength from the access point to the selected client is several dB above the sensitivity of the maximum configure data rate mode, it is very likely that information can be transmitted at the highest data rate, so the coverage metric is one. Signal strengths between those two levels are mapped into a coverage metric by a linear function. Further details of computation of the coverage indicator will now be given.

The coverage metric uses the signal strength from the access points that produce the strongest and second strongest received signals at the selected client. This takes into account that in a heavily loaded network, association requests may sometimes be denied to clients, causing an association request to another access point. The coverage metrics are calculated as follows:

1. Calculate the received signal strength from every access point to the client.
2. Find the strongest received signal ($r_1$) and the second strongest received signal ($r_2$).
3. Convert the signal strengths ($r_1$) and ($r_2$) into coverage metrics using the following function:

$F(r)=0.0$ for $r<R_{SensMin}$ $0.7\ (r-R_{SensMin})/(R_{SensMax}+10-R_{SensMin})$,
$R_{SensMin}<r<R_{SensMax}+10$ $0.7, R_{SensMax}+10<r$ where $R_{SensMin}$ is the sensitivity for the minimum data rate mode and $R_{SensMax}$ is chosen to be a figure several dB above the sensitivity for the maximum configured data rate mode. An 802.11b network will have $R_{SensMin}$=−94 dBm and $R_{SensMax}$=−85 dBm An 802.1 μg network will have $R_{SensMin}$=−94 dBm and $R_{SensMax}$=−68 dBm.

An 802.11a network will have $R_{SensMin}$=−85 dBm and $R_{SensMax}$=−68 dBm.

Once the coverage metrics $F(r_1)$ and $F(r_2)$ are calculated for the first and second strongest received signals, a combined coverage metric for each walkabout point is calculated as follows: coverage=min (1, $F(r_1)+F(r_2)$). This process is completed for all walkabout points. FIG. 7A illustrates coverage metrics for various 802.11 modulation types.

Figure 9:
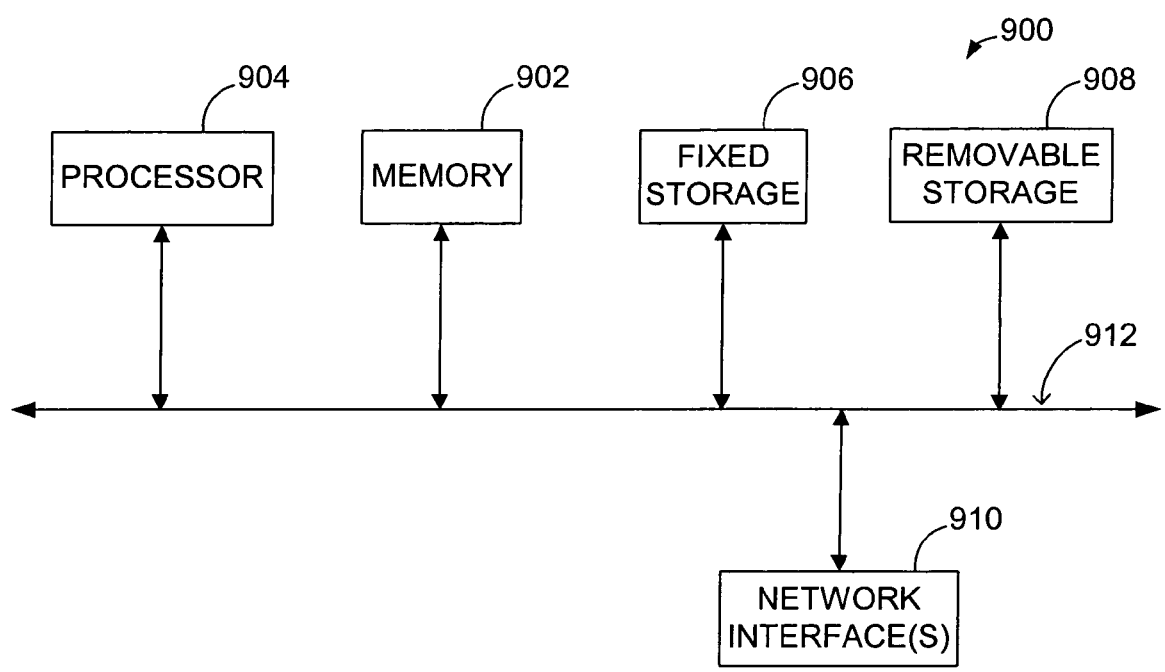
FIG. 9 depicts a computer system useful in implementing embodiments of the present invention.

FIG. 9 shows a system block diagram of computer system 900 that may be used to execute software of embodiments of the present invention. Computer system 900 includes memory 902 which can be utilized to store and retrieve software programs incorporating computer code that implements aspects of the invention, data for use with the invention, and the like. Exemplary computer-readable storage media include CD-ROMS, floppy discs, tape, flash memories, system memories, and hard drives. Additionally, a data signal embodied in a carrier wave may be the transmission medium. Computer system 900 further includes subsystems such as central processor 904, fixed storage 906 and removable storage 908, and one or more network interfaces 910. Other computer systems suitable for use with the present invention may include additional or fewer subsystems. For example, computer system 900 may also incorporate a display for displaying results and/or a keyboard for accepting input.

The system bus architecture of computer system 900 is represented by arrows 912 in FIG. 9. However, these arrows are only illustrative of one possible interconnection scheme serving to link the subsystems. For example, a local bus may be utilized to connect the central processor 904 to the system memory 902. Computer system 900 shown in FIG. 9 is only one example of a computer system suitable for use with the invention. Other computer architectures having different configurations of subsystems may also be utilized.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method of assessing communication quality in a wireless network comprising a plurality of access points, said method comprising:

receiving as input path loss information indicating path losses between a selected client of said wireless network and said access points;

based on said path loss information, determining a capacity indicator that estimates communication impairment for said client due to contention or collision;

based on said path loss information, determining a data rate indicator that estimates an achievable data rate for communication by said selected client;

determining a cell loading indicator that estimates communication impairment due to overloading of a cell occupied by said selected client, said cell loading indicator based on an estimated number of clients in communication with said access points; and based on said capacity indicator, said data rate indicator, and said cell loading indicator, determining a client throughput;

wherein determining said client throughput comprises multiplying said capacity indicator by said data rate indicator and said cell loading indicator.

2. The method of claim 1 further comprising:

repeating said receiving, determining a capacity indicator, determining a data rate indicator, and determining a client throughput for a plurality of clients; and determining a combined quality metric as a reciprocal of an average of reciprocals of client throughputs determined for said plurality of clients.

3. The method of claim 1 wherein determining a capacity indicator comprises:

determining a downstream capacity indicator for an access point associated with said selected client;

determining an upstream capacity indicator for said selected client; and calculating said capacity indicator as a weighted sum of said downstream capacity indicator and said upstream capacity indicator.

4. The method of claim 3 wherein said downstream capacity indicator takes into account contention by said associated access point with other access points, contention by said access point with clients other than said selected client, and collision by said associated access point with other access points.

5. The method of claim 4 wherein said upstream capacity indicator takes into account contention by said selected client with access points other than said associated access point and collisions by said selected client with access points other than said associated access point.

6. Apparatus for assessing communication quality in a wireless network comprising a plurality of access points, said apparatus comprising:

means for receiving as input path loss information indicating path losses between a selected client of said wireless network and said access points;

means for, based on said path loss information, determining a capacity indicator that estimates communication impairment for said client due to contention or collision;

means for, based on said path loss information, determining a data rate indicator that estimates an achievable data rate for communication by said selected client;

means for, determining a cell loading indicator that estimates communication impairment due to overloading of a cell occupied by said selected client, said cell loading indicator based on an estimated number of clients in communication with said access points; and means for, based on said capacity indicator, said data rate indicator, and said cell loading indicator, determining a client throughput;

wherein said means for determining said client throughput comprises means for multiplying said capacity indicator by said data rate indicator and said cell loading indicator.

7. The apparatus of claim 6 further comprising:

means for repeating said receiving, determining a capacity indicator, determining a data rate indicator, and determining a client throughput for a plurality of clients; and means for determining a combined quality metric as a reciprocal of an average of reciprocals of client throughputs determined for said plurality of clients.

8. The apparatus of claim 6 wherein said means for determining a capacity indicator comprises:

means for determining a downstream capacity indicator for an access point associated with said selected client;

means for determining an upstream capacity indicator for said selected client; and means for calculating said capacity indicator as a weighted sum of said downstream capacity indicator and said upstream capacity indicator.

9. The apparatus of claim 8 wherein said downstream capacity indicator takes into account contention by said associated access point with other access points, contention by said access point with clients other than said selected client, and collision by said associated access point with other access points.

10. The apparatus of claim 9 wherein said upstream capacity indicator takes into account contention by said selected client with access points other than said associated access point and collisions by said selected client with access points other than said associated access point.

11. A computer program product embodied as a computer-readable storage medium for assessing communication quality in a wireless network comprising a plurality of access points, said product comprising:

code that causes receipt of path loss information indicating path losses between a selected client of said wireless network and said access points;

code that causes, based on said path loss information, determination of a capacity indicator that estimates communication impairment for said client due to contention or collision;

code that causes, based on said path loss information, determination of a data rate indicator that estimates an achievable data rate for communication by said selected client;

code that causes determination of a cell loading indicator that estimates communication impairment due to overloading of a cell occupied by said selected client, said cell loading indicator based on an estimated number of clients in communication with said access points;

code that causes, based on said capacity indicator, said data rate indicator, and said cell loading indicator, determination of a client throughput; and a computer-readable storage medium that stores the codes;

wherein said code that causes determination of said client throughput comprises code that causes multiplication of said capacity indicator by said data rate indicator and said cell loading indicator.

12. The product of claim 11 further comprising:

code that causes repeated application of said code that causes receiving, code that causes determination of a capacity indicator, code that causes determination of a data rate indicator, and code that causes determination of a client throughput for a plurality of clients; and code that causes determination of a combined quality metric as a reciprocal of an average of reciprocals of client throughputs determined for said plurality of clients.

13. The product of claim 11 wherein said code that causes determination of a capacity indicator comprises:

code that causes determination of a downstream capacity indicator for an access point associated with said selected client;

code that causes determination of an upstream capacity indicator for said selected client; and code that causes calculation of said capacity indicator as a weighted sum of said downstream capacity indicator and said upstream capacity indicator.

14. The product of claim 13 wherein said downstream capacity indicator takes into account contention by said associated access point with other access points, contention by said access point with clients other than said selected client, and collision by said associated access point with other access points.

15. The product of claim 14 wherein said upstream capacity indicator takes into account contention by said selected client with access points other than said associated access point and collisions by said selected client with access points other than said associated access point.

16. Apparatus for assessing communication quality in a wireless network comprising a plurality of access points, said apparatus comprising:

a processor; and a memory device storing instructions for execution by said processor, said instructions comprising:

code that causes receipt of path loss information indicating path losses between a selected client of said wireless network and said access points;

code that causes, based on said path loss information, determination of a capacity indicator that estimates communication impairment for said client due to contention or collision;

code that causes, based on said path loss information, determination of a data rate indicator that estimates an achievable data rate for communication by said selected client;

code that causes determination of a cell loading indicator that estimates communication impairment due to overloading of a cell occupied by said selected client, said cell loading indicator based on an estimated number of clients in communication with said access points; and code that causes, based on said capacity indicator, said data rate indicator, and said cell loading indicator, determination of a client throughput;

wherein said code that causes determination of said client throughput comprises code that causes multiplication of said capacity indicator by said data rate indicator and said cell loading indicator.

17. The apparatus of claim 16 wherein said instructions further comprise:

code that causes repeated application of said code that causes receiving, code that causes determination of a capacity indicator, code that causes determination of a data rate indicator, and code that causes determination of a client throughput for a plurality of clients; and code that causes determination of a combined quality metric as a reciprocal of an average of reciprocals of client throughputs determined for said plurality of clients.

18. The apparatus of claim 16 wherein said code that causes determination of a capacity indicator comprises:

code that causes determination of a downstream capacity indicator for an access point associated with said selected client;

code that causes determination of an upstream capacity indicator for said selected client; and code that causes calculation of said capacity indicator as a weighted sum of said downstream capacity indicator and said upstream capacity indicator.

19. The apparatus of claim 18 wherein said downstream capacity indicator takes into account contention by said associated access point with other access points, contention by said access point with clients other than said selected client, and collision by said associated access point with other access points.

20. The apparatus of claim 19 wherein said upstream capacity indicator takes into account contention by said selected client with access points other than said associated access point and collisions by said selected client with access points other than said associated access point.

* * * * *